United States Patent [19]

La Mantia et al.

[11] 3,920,794
[45] Nov. 18, 1975

[54] METHOD FOR REMOVAL OF SULFUR DIOXIDE FROM GASES

[75] Inventors: Charles R. La Mantia, Lexington; James I. Stevens, Bedford, both of Mass.

[73] Assignee: Arthur D. Little, Inc., Cambridge, Mass.

[22] Filed: Sept. 28, 1972

[21] Appl. No.: 293,021

[52] U.S. Cl. ............................... 423/242; 423/551
[51] Int. Cl.² ......................................... C01B 17/00
[58] Field of Search ............ 423/242, 244, 551, 517, 423/520, 540, 544, 512; 23/288 E, 288 EI, 261

[56] References Cited
UNITED STATES PATENTS

| | | | |
|---|---|---|---|
| 1,908,782 | 5/1933 | Pearce | 23/260 |
| 1,913,276 | 6/1933 | Hodsman et al. | 204/93 |
| 2,021,936 | 11/1935 | Johnstone | 423/242 |
| 2,165,784 | 7/1939 | Burrage | 423/242 |
| 3,389,829 | 6/1968 | Stanford | 423/242 |
| 3,556,722 | 1/1971 | Owaki | 423/242 |
| 3,607,001 | 9/1971 | Finfer | 423/242 |
| 3,607,001 | 9/1971 | Finfer | 423/242 |
| 3,781,407 | 12/1973 | Kamijo et al. | 423/242 |

FOREIGN PATENTS OR APPLICATIONS

| 1,267,409 | 2/1961 | France | 423/242 |
|---|---|---|---|

OTHER PUBLICATIONS

Jacobson—*Encyclopedia of Chemical Reactions*—1956, p. 358.

*Primary Examiner*—Oscar R. Vertiz
*Assistant Examiner*—Eugene T. Wheeler
*Attorney, Agent, or Firm*—Bessie A. Lepper

[57] ABSTRACT

Method and apparatus for removing sulfur dioxide from a gas mixture, particularly from combustion gases. The gases are scrubbed with a aqueous scrubbing liquid containing dissolved therein an inorganic reactant capable of forming a sulfite salt with the sulfur dioxide and an oxidization catalyst capable of oxidizing the sulfite salt to the corresponding sulfate salt during the scrubbing process. If the gas mixture does not contain sufficient oxygen, then air may be added during scrubbing.

5 Claims, 1 Drawing Figure

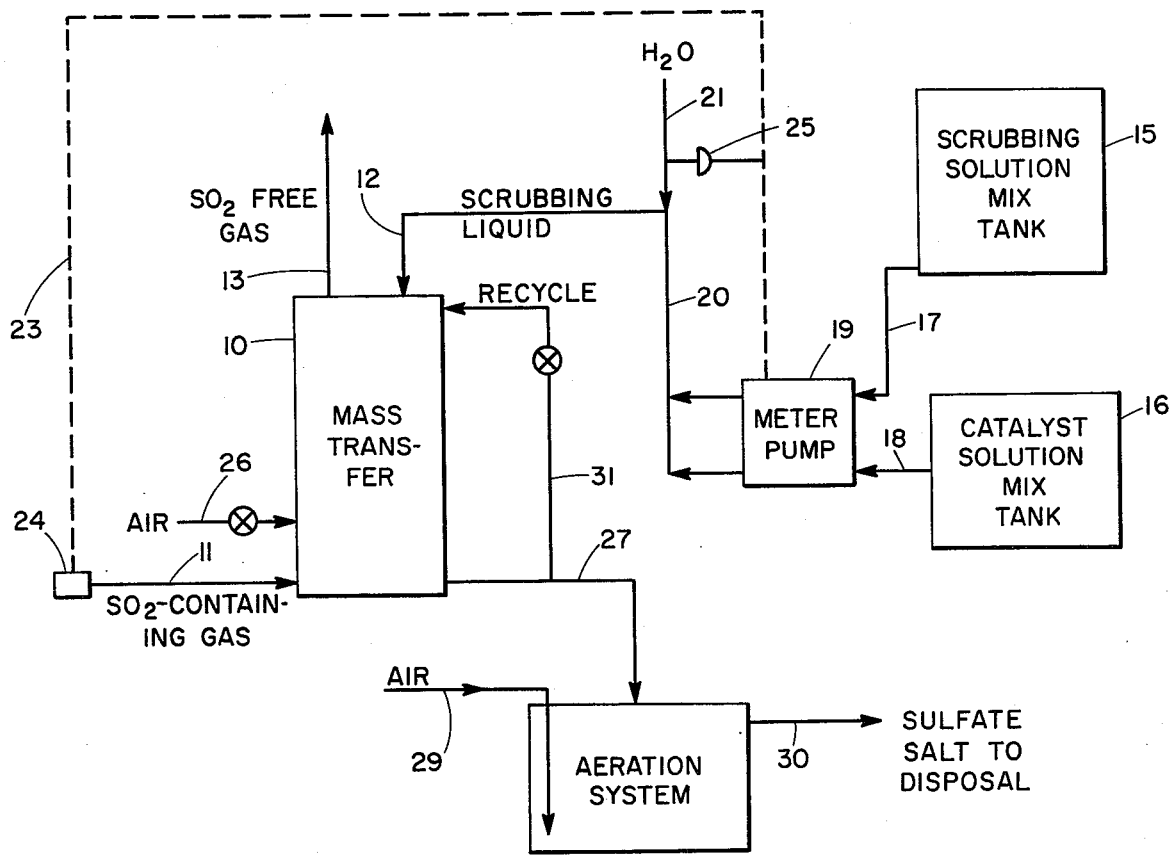

METHOD FOR REMOVAL OF SULFUR DIOXIDE FROM GASES

This invention relates to the removal of sulfur dioxide from effluent gas streams, and more particularly to the removal of sulfur dioxide from such gas streams resulting from the combustion of sulfur-containing fuels.

Federal, state and local emission regulations are being promulgated which limit the amount of sulfur dioxide that can be emitted from stationary combustion devices and from other sources. Since sulfur is very often present in hydrocarbon fuels and in coal and burns to $SO_2$ during the combustion process, it is necessary to provide an efficient method for its removal from the products of combustion. Moreover, if the $SO_2$ is removed through a chemical reaction, the resulting reaction product must itself be of a nature which does not contribute to the pollution problem. Hence, if the stack gases, or other discharged gases, are contacted with a reactant such as NaOH or $Na_2CO_3$, the resulting $Na_2SO_3$ can not be discharged into streams because it will react with oxygen dissolved in the stream to form $Na_2SO_4$ and in doing so will deprive the stream water of biologically needed oxygen. In similar manner, if the $Na_2SO_3$ containing liquid is put through an aeration process prior to sewering, the $Na_2SO_3$ will have an immediate oxygen demand which must be satisfied in the aeration equipment at the expense of other components requiring oxygen.

Although NaOH and $Na_2CO_3$ are known and used as effective chemical reactants for the removal of $SO_2$ from gases, the use of these reactants now requires the supplying of large, space-consuming equipment for the further conversion of $Na_2SO_3$ to $Na_2SO_4$. Such equipment in turn involves the outlay of large capital expenditures, along with the continuing attendant cost of upkeep and operation. Moreover, at many existing plant locations, sufficient space is not available for such aeration equipment.

Since NaOH and $Na_2CO_3$ are relatively inexpensive reactants to use in the removal of $SO_2$, since they are readily soluble in water to make a suitable aqueous scrubbing liquid usable at ambient temperature, and since such a control process is simpler, more reliable and requires lower capital costs than more complex processes, it would be desirable to have available method and apparatus by which $SO_2$ may be reacted with NaOH or $Na_2CO_3$ to convert a major portion of the $SO_2$ directly to $Na_2SO_4$ and to thereby minimize the equipment and cost for converting $Na_2SO_3$ to $Na_2SO_4$. This invention provides such a method and apparatus.

It is therefore a primary object of this invention to provide an improved method for removing $SO_2$ from gases, particularly combustion gases. It is another object of this invention to provide a method of the character described which converts a major portion of the $SO_2$ to a suitable sulfate salt which may be introduced into sewers or streams without further treatment and without making any undue demand for oxygen required by other systems, e.g., microorganisms which biologically degrade many kinds of waste materials. It is yet another object of this invention to provide a method for removal of $SO_2$ which requires a minimum of plant space to operate.

Another primary object of this invention is to provide apparatus for reacting $SO_2$ in gases to convert a major portion of the $SO_2$ directly to a suitable sulfate salt and hence to minimize the equipment and space required for further reacting any sulfite formed. Other objects of the invention will in part be obvious and will in part be apparent hereinafter.

In brief, the method of this invention comprises the step of adding to the scrubbing liquid a water-soluble salt of an appropriate metal capable of catalyzing the oxidation of sulfites to sulfates using the oxygen available in the combustion gas stream. In the presence of this catalyst, the $SO_2$ is absorbed and reacted with for example NaOH or $Na_2CO_3$ to form $Na_2SO_3$ which is reacted directly with the excess oxygen in the gases being treated. Additional air can be introduced into the gases to supplement the oxygen supply.

The apparatus of this invention includes means for metering out a predetermined amount of an aqueous solution of the metal catalyst and introducing it at a point where it is thoroughly and uniformly mixed throughout the scrubbing liquid.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing which is a simplified flow diagram illustrating the method and apparatus of this invention.

It will be convenient to describe this invention in terms of the use of sodium compounds as the scrubbing reactant, e.g., sodium hydroxide, NaOH, and sodium carbonate, $Na_2CO_3$. However, it is to be understood that water-soluble inorganic reactants containing other cations such as $NH_4^+$, $Ca^+$, $K^+$ and the like, which react with $SO_2$ to form the sulfite salt which in turn is oxidizable to the sulfate salt may be used.

As will be seen in the drawing, the $SO_2$-containing gas is contacted with the scrubbing liquid in any mass transfer apparatus 10 suitable for effecting efficient gas-liquid contact to convert essentially all of the $SO_2$ to a sulfite salt, e.g., $Na_2SO_3$. Such mass transfer apparatus may be for example a countercurrent or cocurrent scrubbing tower. In the drawing, a countercurrent scrubber 10 is shown in which the $SO_2$-containing gas is introduced near the bottom through line 11 and the scrubbing liquid is introduced at the top through line 12. The $SO_2$-free gas is discharged through line 13 which may be vented to the atmosphere or connected to other equipment (not shown) such as a heat exchanger, etc.

It is necessary to mix a metered quantity of a solution containing the oxidation catalyst uniformly into the scrubbing liquid prior to its making contact with the gas to be scrubbed. One way of doing this is illustrated in the drawing wherein there is provided a source 15 of concentrated aqueous solution of NaOH or $Na_2CO_3$, a source 16 of a aqueous solution of the catalyst and lines 17 and 18, respectively, adapted to convey these liquids to a meter pump 19 which can be set to pump the two liquids at different predetermined flow rates. The pump discharges into line 20 which is in fluid communication with a line 21 conveying additional water to adjust the scrubbing liquid entering line 12 to a preset, desired concentration.

The metal used to catalyze the oxidation of $Na_2SO_3$ to $Na_2SO_4$ during the mass transfer process is a metal which is capable of undergoing a single-electron transfer process. Representative of such metals are iron, cobalt, copper, manganese and nickel. The metals are provided in the form of water-soluble salts, preferably salts of one of the strong mineral acids such as sulfuric, nitric, hydrochloric or phosphoric. The amount of catalyst used, based on metal ion weight of the catalyst, is at least about one part by weight per million parts by weight of the scrubbing liquid. Although up to 10 parts by weight may be used, it is preferable to maintain the amount of metal ion as low as possible while effecting the desired catalysis. The aqueous solution of the metal salt may be of any convenient concentration within the solubility limits of the metal salt used.

It is generally preferable to make up a concentrated aqueous solution of the scrubbing salt and dilute it to the desired concentration just prior to introducing it into the mass transfer equipment. However, the scrubbing solution may, if desired be made up in its final concentration prior to the introduction of the aqueous catalyst solution. The amount of sodium (or other metal ion) in the scrubbing liquid should be substantially the stoichiometric quantity required to react with all of the $SO_2$ to be removed from the gas. Thus in the case of a monovalent metal such as sodium, there should be substantially two moles of the reactant $Na^+$ for each mole of $SO_2$; and for divalent metals such as calcium the mole ratio should be substantially one-to-one.

Since the amount of scrubbing liquid is a function of the total amount of gas being scrubbed as well as of the scrubber design, the actual concentration of the scrubbing salt in the aqueous scrubbing liquid is variable, being determined by the above-stated ratio of metal ion to $SO_2$ present in the gas. For any given system, the amount of scrubbing liquid may be automatically metered with reference to any boiler operating signal proportional to the $SO_2$ flow rate, such as boiler operating rate. Thus the dotted line 23 in the drawing is seen to connect a signal proportional to the $SO_2$ rate with the meter pump 19 and water line 21 through valve 25 to continuously adjust the amount of scrubbing solution to the $SO_2$ content of the gas being purified.

Stack gases or other combustion gases are normally between about 250° and 500°F when they enter the scrubber, a fact which enhances the oxidation reaction rate of the sulfite formed by reaction of $SO_2$ and the NaOH, $Na_2CO_3$ or other scrubbing reactant. The reaction proceeds at flue gas pressures and the only energy in the form of gas pressurization which need be put into the system is that which is required to effect the contacting by moving the gas through the scrubber, ducting, etc.

In prior art processes $SO_2$ has been reacted with a salt such as $Na_2CO_3$ to form the sulfite according to the equation $$SO_2 + Na_2CO_3 \rightarrow Na_2SO_3 + CO_2 \qquad (1)$$

However, by the introduction of the oxidation catalyst into the scrubbing liquid according to this invention, the excess oxygen in the combustion gases and/or added to the gas mixture can be used to simultaneously oxidize most of the $Na_2SO_3$ within the scrubber as represented by the following overall equation $$2SO_2 + O_2 + 2Na_2CO_3 \rightarrow 2Na_2SO_4 + 2CO_2 \qquad (2)$$

Completion of the oxidation and saturation with the oxygen can be accomplished in a secondary aeration system. By use of the excellent mass transfer characteristics of the scrubber by catalysis, oxidation in the scrubber is maximized and the size and operating costs of the secondary oxidation system are reduced.

It is, of course, possible to write analagous equations using NaOH, as well as other inorganic compounds used as the scrubbing salt.

Air may be introduced into the scrubber, such as through valve-controlled line 26, to increase the oxygen content of the flue gas and increase oxidation in the scrubber.

Subsequent to the completion of the mass transfer between gas and scrubbing liquid, the liquid containing the sulfate salt is withdrawn through line 27 from the scrubber, and if there remains any appreciable quantity of unoxidized sulfite salt, the scrubbing liquid is further aerated in a suitable aeration system 28 by introducing air from one or more lines 29 through it before being directed into a disposal line 30. If the amount of sulfite salt in the discharged scrubbing liquid is less than an acceptably low amount, then the scrubbing liquid may be discharged directly into disposal line 30. Under some conditions of operation, e.g., where high liquid rates are required because of scrubber design, it may be desirable to recirculate a portion of the discharged scrubbing liquid through the scrubber. There is therefore shown a valve-controlled recycle line 31.

The removal of $SO_2$ from stack gases by this invention may be further described with reference to the following actual operational example which is meant to be illustrative and not limiting.

A steam plant operating at a rate of 240,000 pounds per hour of steam and using a fuel having a sulfur content of 3.2 weight percent generates 1550 pounds of $SO_2$ per hour. Of this $SO_2$, 1500 pounds per hour must be removed, requiring a total of 375 pounds per hour of oxygen to convert sulfite to sulfate. When no catalyst is introduced into the scrubbing liquid, only 35 pounds per hour of oxygen is consumed in the scrubber, leaving 340 pounds per hour of oxygen to be used in oxidizing sulfite to sulfate in a separate aeration system which must be large enough to handle this rate of aeration and final oxidation.

When a catalyst, e.g., cobalt sulfate, is added to the scrubbing solution in accordance with this invention, 280 pounds of oxygen per hour are consumed in the scrubber to oxidize the sulfite formed in the scrubber to sulfate. This in turn means that only 95 (375–280) pounds of oxygen per hour must be supplied in an aerator system to complete the oxidation of the sulfite. This then in turn means that the aerator system in the practice of this invention need be only 28% as large as the aerator system where no catalyst is added to the scrubbing solution. Stated another way, the aeration system may be reduced in size by 72% for these operating conditions.

This invention thus provides a method and apparatus for materially reducing the size of aeration equipment in removing sulfur dioxide from stack gases and the like. In some instances it may be possible to eliminate such aeration equipment altogether. With this material reduction in the size of such equipment comes a marked reduction in capital costs and operating and maintenance expenses. Finally, the reduction is space required for aeration equipment may even make it possible to install sulfur dioxide removal systems in plants which would otherwise not have the space for large added equipment.

It will thus be seen that the objects set forth above, among those made apparent from the proceding description, are efficiently attained and, since certain changes may be made in carrying out the above method and in the construction set forth without departing from the scope of the invention, it is intended that all matter contained in the above description or shown in the accompany drawings shall be interpreted as illustrative and not in a limiting sense.

We claim:

1. A method of removing sulfur dioxide from a gas mixture comprising the products of a combustion process, comprising the steps of
   a. contacting said gas mixture with a scrubbing liquid consisting essentially of an aqueous solution of
      1. an inorganic reactant containing sodium ions which form a water-soluble sulfite salt with said sulfur dioxide, said sulfite salt being oxidizable to the corresponding sulfate salt, the quantity of said inorganic reactant being that required to provide an essentially stoichiometric amount of the sodium ions of said reactant to react with all of the sulfur dioxide to be removed from said gas mixture, and
      2. an oxidation catalyst which is a water-soluble salt of a metal selected from the group consisting of cobalt, copper, iron, manganese and nickel and a strong mineral acid present in an amount to provide at least one part by weight of said metal per million parts by weight of said aqueous scrubbing liquid; and
   b. simultaneously with said contacting, providing sufficient oxygen in said gas mixture to oxidize the major part of the sulfite formed to sulfate, whereby the sulfur dioxide in said gas mixture reacts with said inorganic reactant to form a sulfite salt which is oxidized to the corresponding sulfate salt directly in said aqueous scrubbing liquid.

2. A method in accordance with claim 1 wherein said sufficient oxygen is at least in part provided in said gas mixture containing said sulfur dioxide.

3. A method in accordance with claim 1 wherein the step of providing sufficient oxygen comprises introducing air into said aqueous scrubbing liquid during said contacting step.

4. A method in accordance with claim 1 wherein said inorganic reactant is sodium hydroxide.

5. A method in accordance with claim 1 wherein said inorganic reactant is sodium carbonate.

* * * * *